(12) United States Patent
Hasegawa et al.

(10) Patent No.: US 9,502,052 B1
(45) Date of Patent: Nov. 22, 2016

(54) WRITING REDUNDANT DATA ON TAPE MEDIA

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/972,151

(22) Filed: Dec. 17, 2015

(51) Int. Cl.
*G11B 5/09* (2006.01)
*G11B 5/008* (2006.01)
*G11B 27/36* (2006.01)
*G11B 5/012* (2006.01)
*G11B 20/18* (2006.01)
*G11B 15/18* (2006.01)
*G11B 5/584* (2006.01)
*G11B 5/55* (2006.01)

(52) U.S. Cl.
CPC .............. *G11B 5/09* (2013.01); *G11B 5/00813* (2013.01); *G11B 27/36* (2013.01); *G11B 5/012* (2013.01); *G11B 5/5508* (2013.01); *G11B 5/584* (2013.01); *G11B 15/1875* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 7,987,404 B2 | 7/2011 | Fukuda et al. | |
| 8,773,795 B1* | 7/2014 | Biskeborn | G11B 5/00878 360/48 |
| 8,988,817 B1 | 3/2015 | Cherubini et al. | |
| 9,053,745 B2* | 6/2015 | Abe | G11B 20/1201 |
| 9,063,666 B2* | 6/2015 | Amir | G06F 3/0611 |
| 9,086,810 B2 | 7/2015 | Itagaki et al. | |
| 9,171,563 B1* | 10/2015 | Biskeborn | G11B 5/584 |
| 2012/0320727 A1 | 12/2012 | Matsumiya et al. | |
| 2013/0246701 A1* | 9/2013 | Fujihara | G06F 3/0682 711/111 |
| 2015/0062733 A1* | 3/2015 | Ashida | G06F 3/0613 360/39 |
| 2015/0077881 A1* | 3/2015 | Biskeborn | G11B 5/00826 360/121 |
| 2015/0116858 A1* | 4/2015 | Itagaki | G06F 3/0613 360/49 |
| 2015/0199980 A1 | 7/2015 | Aoki | |

\* cited by examiner

*Primary Examiner* — Tan X Dinh
(74) *Attorney, Agent, or Firm* — Erik K. Johnson

(57) ABSTRACT

A request to write a data set to a magnetic tape medium is received. The data set is written in a first write direction of the magnetic tape medium. The data set is written in an opposite write direction of the magnetic tape medium.

20 Claims, 4 Drawing Sheets

WRITING REDUNDANT DATA ON TAPE MEDIA

FIELD OF THE INVENTION

The present invention relates generally to the field of magnetic information storage and retrieval, and more particularly to writing redundant data in both write directions of a magnetic tape storage medium.

SUMMARY

Embodiments of the present invention provide systems, methods, and program products. A request to write a data set to a magnetic tape medium is received. The data set is written in a first write direction of the magnetic tape medium. The data set is written in an opposite write direction of the magnetic tape medium.

DETAILED DESCRIPTION

Figure 1A:
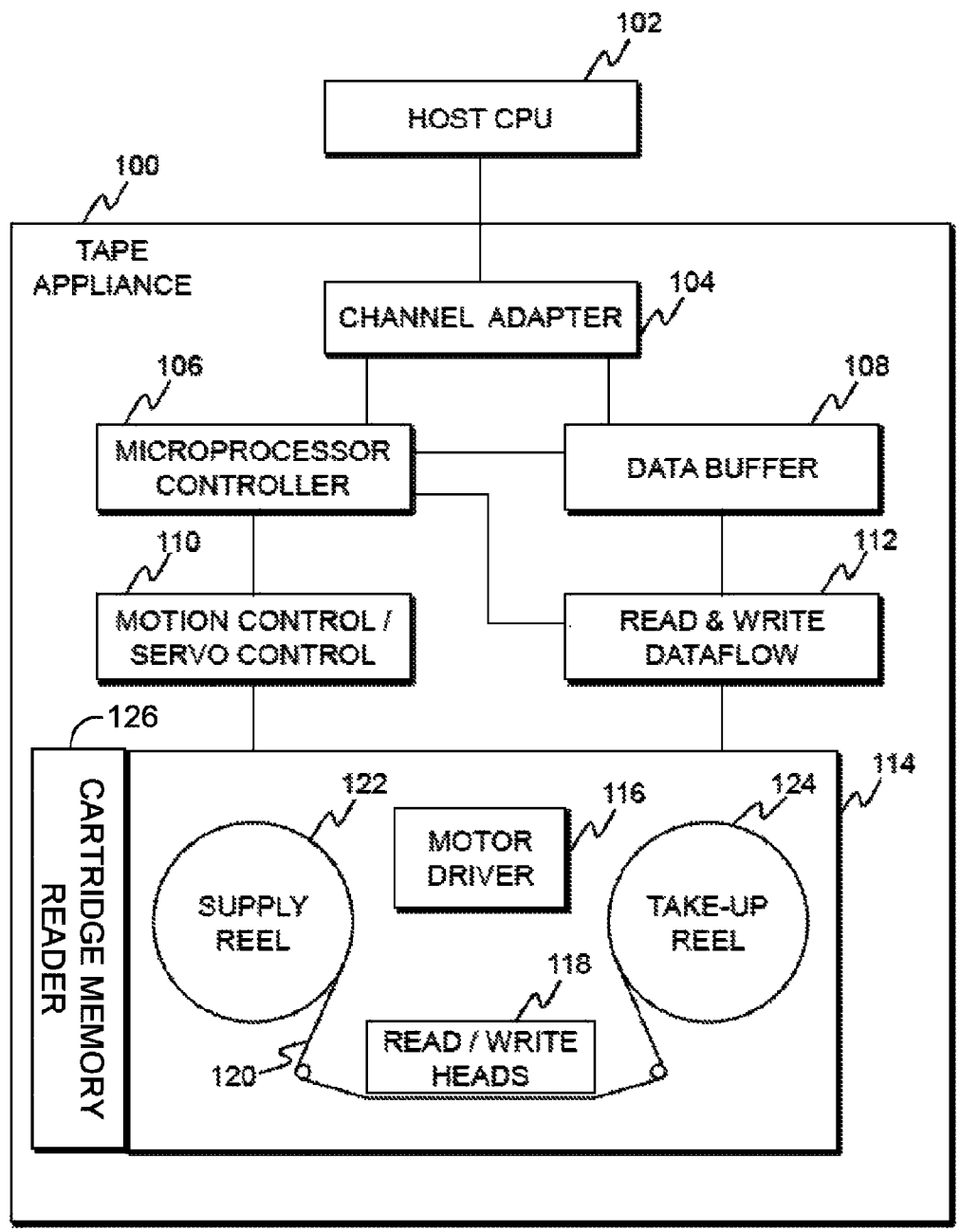
FIG. 1A is a functional block diagram illustrating a tape recording appliance, in accordance with an embodiment of the present invention.

A magnetic storage device, such as a tape appliance, can be used to write data to a magnetic tape medium and read data from the magnetic tape medium for a host computer system coupled to the tape appliance. A process for writing data to the magnetic tape medium may involve a read/write head which writes data on a number of data tracks of the magnetic tape medium. Typically, the read/write head can write data simultaneously on data tracks of the magnetic tape medium. A read/write head may include a number of read/write transducers in a transducer array arranged transversely with respect to the tape medium, where each read/write terminal is configured to read data from and/or write data to each of the data tracks of the tape storage medium. Additionally, a read/write head can be configured as RWR or WRW so as to allow for read verification after write. In instances where a verification error is found, the same data is read from a data buffer component and written to the magnetic tape medium again.

A magnetic tape medium moves in a longitudinal direction with respect to the read/write heads, referred to as a running direction, and a read/write head of the magnetic tape medium is arranged transversely with respect to the running direction. Additionally, the width of a read/write head transducer array can be smaller relative to the width of the magnetic tape medium. As a result, the magnetic tape medium can be iteratively moved forwards and backwards in the running direction, and a latitudinal position of the read/write head is gradually shifted in accordance with each movement iteration of the magnetic tape medium. Movement of the magnetic tape medium in a direction, such as from a supply reel in the cartridge to a take-up reel in the tape appliance, will be referred to as a forward direction. Movement of the magnetic tape medium in the reverse direction, such as from the take-up reel to the supply reel, will be referred to as a backward direction. A wrap of the tape storage medium refers to movement in the forward or backward direction for an entire length of the magnetic tape medium.

Components of a tape appliance can format device data from a host computer system into physically formatted device data, such as a data set, which can be recorded on a magnetic tape medium. Linear Tape File System (LTFS) allows files stored on the magnetic tape medium to be accessed as if the magnetic tape medium is a hard disk drive (HDD) or a removable flash drive, such as a universal serial bus (USB) flash drive. When LTFS is used, the magnetic tape medium is partitioned into an index partition and data partition. Each LTFS index recorded on the magnetic tape medium includes a pointer that points to a first data block of a file or data set in the data partition, and includes additional metadata for the respective data set. In LTFS, a tape appliance and components therein can perform a process known as periodic synchronization to ensure that indices are written to the magnetic storage medium subsequent to writing associated data sets to the magnetic storage medium. For example, subsequent to writing a data set to the data partition of the magnetic storage medium, an associated LTFS index is written to the data partition, and after a designated time duration a latest LTFS index written to the data partition is written to the index partition. In this example, an LTFS index written to the data partition with a latest generation value is identified as the LTFS index to write to the index partition during a periodic synchronization process.

Failure in a read/write head may prevent reading and/or writing data to and/or from a corresponding data track for the failed read/write head. A tape appliance and components therein may include an error correction code while writing a data set to a data partition of a tape storage medium, so that reading and/or writing the data set can be performed in the event of a read/write head failure. In certain instances, a read/write head failure may result in more frequent read and/or write error occurrences in a forward direction rather than a backward direction. For example, if a forward direction is more error prone due to a failure in read or write transducer arrays of the read/write head used in the forward direction, then reading an LTFS index written to the data partition in a forward direction and the LTFS index written to the index partition in the forward direction may not be successful. It would be advantageous to implement another index writing scheme, which involves writing data in both running directions, that is a forward direction and a backward direction, such that an LTFS index written in both the index partition and the data partition can always be accessed, even in instances where data written on a particular direction cannot be read due to, for example a failure in a read/write head.

Embodiments of the present invention provide systems, methods, and computer program products for writing redundant data in both running directions on a magnetic tape medium. Embodiments of the present invention provide improved accessibility to redundant data, such as an LTFS index that is written in both running directions, in instances where data written in a particular running direction cannot be read.

FIG. 1A is a functional block diagram of a tape appliance 100, in accordance with an embodiment of the invention. In an exemplary embodiment, tape appliance 100 may be a tape drive. Tape appliance 100 may include several components providing a control and data transfer system for reading and writing data from a host CPU 102, an embodiment of which is described below in relation to FIG. 3, on a magnetic tape medium. By way of example only, those components may include a channel adapter 104, a computer, such as microprocessor controller 106, a data buffer 108, a read/write data flow circuit 112, a motion control system 110, and a tape interface system 114 that includes a motor driver circuit 116 and read/write heads 118.

Microprocessor controller 106 may provide overall control functionality for the operations of all other components of tape appliance 100. The functions performed by microprocessor controller 106 may be programmable via microcode routines (not shown) according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium. Read/write dataflow circuitry 112 is responsible for executing all read/write data transfer operations under the control of microprocessor controller 106. Formatted physical data from read/write circuitry 112 is communicated to tape interface system 114. The latter includes one or more read/write modules in read/write head unit 118, and drive motor components (not shown) for performing forward and reverse movement of a magnetic tape medium 120 mounted on a supply reel 122 and a take-up reel 124. The drive components of tape interface system 114 are controlled by motion control system 110 and motor driver circuit 116 to execute such tape movements as forward and reverse recording and playback, rewind and other tape motion functions. In addition, in multi-track tape drive systems, motion control system 110 transversely positions read/write heads 118 relative to the direction of longitudinal tape movement in order to record data in a plurality of tracks. Cartridge memory reader 126 interacts with nonvolatile memory of a tape cartridge, such as cartridge memory 156, as described in greater detail with relation to tape cartridge 150 of FIG. 1B. In one embodiment, described in more detail below, microprocessor controller 106 uses cartridge memory 156, via cartridge memory reader 126, as temporary storage for information about data that is to be written in both running directions of magnetic tape medium 120, such as a generation value of an LTFS index.

In certain embodiments, during read operations, microprocessor controller 106 may receive the unformatted electrical signals from tape interface system 114, either directly or via read dataflow circuitry 112. In other embodiments, read dataflow circuitry 112 may perform various pre-processing functions on the electrical signals from tape interface system 114, and transmit information that is representative of the electrical signals to microprocessor controller 106. In these embodiments, microprocessor controller 106 may include appropriate electrical circuitry, logic, firmware, software, etc., to perform analysis of the electrical signals or information to determine various characteristics of the signals related to quality of the recorded data and magnetic tape medium 120, in accordance with embodiments of the invention. In general, the appropriate electrical circuitry, logic, firmware, software, etc., to perform analysis of the electrical signals to determine various characteristics of the signals related to quality of the recorded data and magnetic tape medium 120 may be located in one or more functional components of a tape appliance, such as tape appliance 100, and/or in a host computer, such as host CPU 102.

Figure 1B:
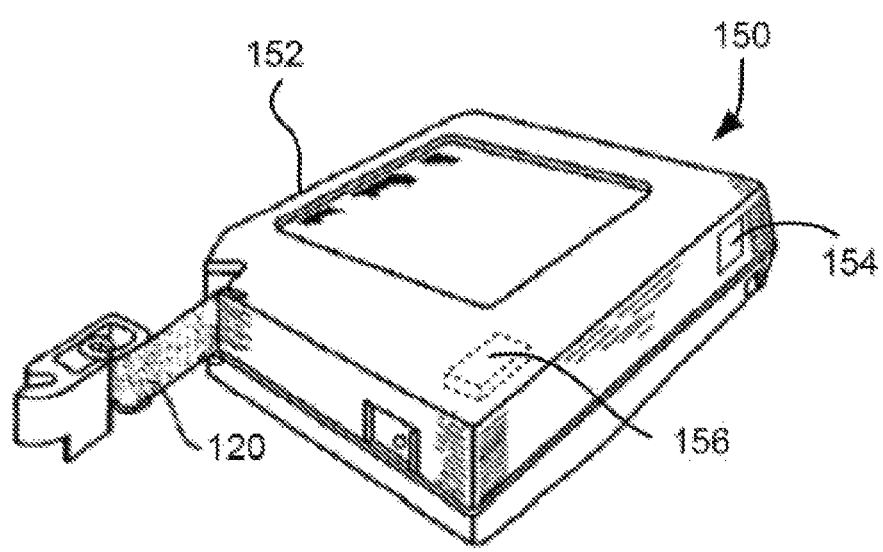
FIG. 1B illustrates an exemplary tape cartridge, in accordance with an embodiment of the present invention.

FIG. 1B illustrates an exemplary tape cartridge 150 according to an embodiment. Tape cartridge 150 may be used with a system such as tape appliance 100 shown in FIG. 1A. As shown, tape cartridge 150 includes housing 152, magnetic tape medium 120 in housing 152, and cartridge memory 156 coupled to housing 152. In some embodiments, cartridge memory 156 may be embedded inside housing 152. In other embodiments, cartridge memory 156 may be attached to the inside or outside of housing 152 without modification of housing 152. For example, cartridge memory 156 may be embedded in self-adhesive label 154. In one preferred embodiment, cartridge memory 156 may be a cartridge memory component, embedded into or coupled to the inside or outside of tape cartridge 150, which is configured to store information for data written to magnetic tape medium 120, as described in greater detail below. Cartridge memory 156 may be accessible by tape appliance 100, and the tape operating software (the driver software) residing on host CPU 102.

In an exemplary embodiment, tape cartridge 150 meets the standards specifications of one or more of the Linear Tape Open (LTO) generations, such as LTO-6. All trademarks used herein are the property of their respective owners. In such an embodiment, supply reel 122 may be integral to the LTO tape cartridge, and the end of tape 120 includes a leader pin (not shown) which is mechanically grasped by features (not shown) of tape interface system 114 and threaded onto take-up reel 124.

It would be advantageous to implement a data writing scheme that writes redundant data, such as an LTFS index, to both directions of magnetic tape medium 120 to access the LTFS index in an event where the LTFS index written in a particular running direction cannot read due to, for example a failure in a read/write head. For example, cartridge memory 156 can include information, such as a generation value for each LTFS index written to an index partition and data partition of magnetic tape medium 120, a write direction of each LTFS index, such as a forward write direction or backward write direction, as well as a longitudinal position (LPOS) for a first data block of each LTFS index and a last data block of each LTFS index. Filler data may be written to magnetic tape medium 120 until a respective wrap is complete to ensure that data, such as an LTFS index of a same generation value, is written to both forward and backward directions of an index partition in magnetic tape medium 120. For example, once it has been determined that an LTFS index has been written to magnetic tape medium 120 in a forward direction but not in a backward direction, then filler data may be written in the current write direction, which is the forward direction, until the forward wrap is complete. Accordingly, a backward wrap will begin by moving magnetic tape medium 120 in the backward direction where the LTFS index can be written. Cartridge memory 156 may also include information pertinent to filler data written in either direction of magnetic tape medium 120, such as an LPOS for a first data block and a last data block of filler data. In certain instances, a first portion of a data set may be written in a forward direction and a second portion of the data set may be written in the opposite direction. When this occurs, the first portion of the data set is also written in the opposite direction and the second portion of the data set is also written in the forward direction. Accordingly, each portion of the data set is written in both running directions of magnetic tape medium 120.

The exemplary embodiment as presented herein refers to writing a data set, such as an LTFS index of a same generation value, in both running directions of magnetic tape medium 120. In other embodiments, the data sets that are automatically written in both tape directions can be of any types of data sets, such as user or application data for host CPU 102. For example, high resolution tape directory information can also be written in both running directions on magnetic tape medium 120, where LTFS technology is not implemented. In another example, a process for writing redundant data can be performed on more than one magnetic tape medium 120, such that data is written in a first running direction on a first magnetic tape medium 120 and is written in the opposite running direction on a second magnetic tape medium 120.

Generally, data sets to write in both tape directions can be automatically identified, based on one or more data set characteristics. For example, such datasets may be automatically identified based on a predefined data set name, or the presence of a predefined character string in the data set name, or a file type or format. Other characteristics to automatically identify such datasets may include certain character strings or other string values that are detected in the contents of the data set as it is first written to tape. If such a string value is detected, the data set is automatically written to the tape a second time in the reverse tape direction.

Figure 2:
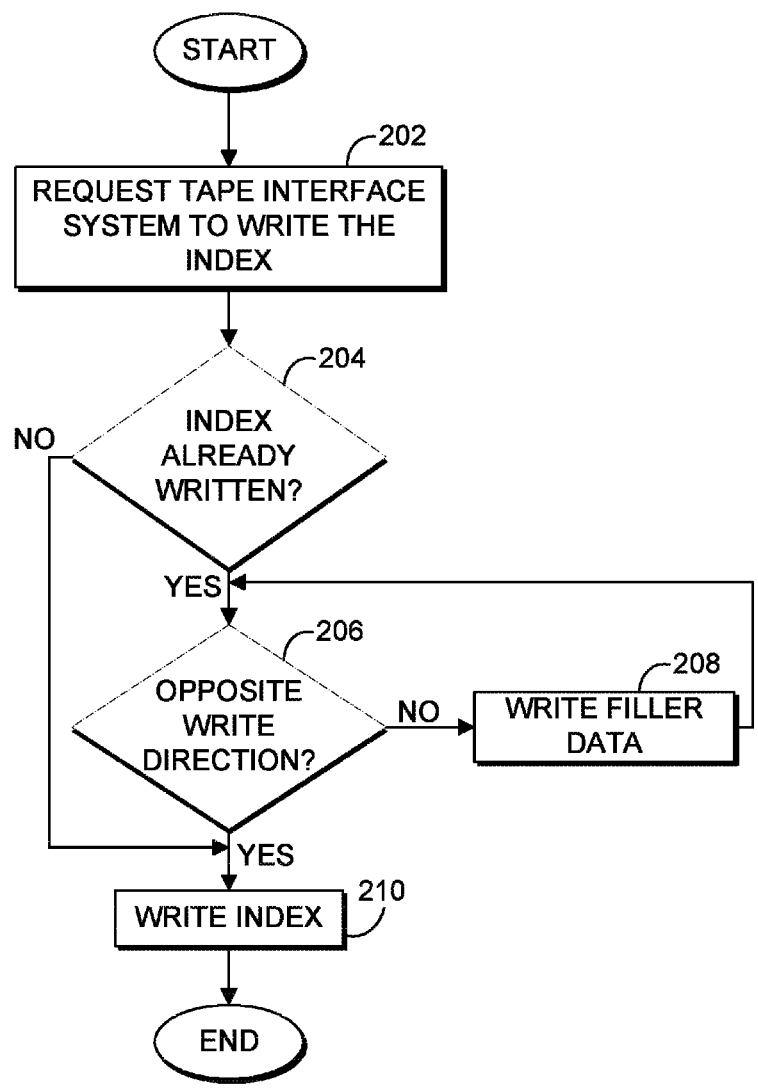
FIG. 2 is a flowchart illustrating operational steps for writing an LTFS index, in accordance with an embodiment of the present invention.

FIG. 2 is a flowchart illustrating operational steps for writing an LTFS index, in accordance with an embodiment of the present invention. In one embodiment, cartridge memory reader 126 can have a non-contact interface to interact with cartridge memory 156 to identify an associated generation value for each LTFS index written to the magnetic tape medium 120. An associated generation value for each LTFS index indicates a version of an LTFS index. In one example, an LTFS index having a largest generation value, that is a most recent version of an LTFS index, is first written to a data partition, and then the LTFS index of the same generation value is written to the index partition during a periodic synchronization process. As previously described, operational steps as described below can be implemented by tape appliance 100 to write redundant data of any type, in any file system, and any storage method used by tape appliance 100.

Microprocessor controller 106 requests tape interface system 114 to write an LTFS index to an index partition of magnetic tape medium 120 (step 202). In this embodiment, magnetic tape is moving in either a forward direction or backward direction. A current running direction of magnetic tape medium 120 can be identified and the identified direction as well as a generation value of the LTFS index is written to cartridge memory 156. Before tape interface system 114 writes the requested LTFS index, microprocessor controller 106 determines whether an LTFS index having the same generation value as the requested LTFS index is already written to a location in the index partition of magnetic tape medium 120 (decision 204). For example, microprocessor controller 106 can interact with cartridge memory reader 126 to access information stored in cartridge memory 156 for determining whether an LTFS index having the same generation value as the requested LTFS index is already written to a location in the index partition of magnetic tape medium 120. Alternatively, a counter can be maintained by microprocessor controller 106, which can be used as a directional indicator for each LTFS index that is written in either a forward or backward direction.

If, microprocessor controller 106 determines that the requested LTFS index is already written to a location in the index partition of magnetic tape medium 120 ("yes" branch, decision 204), then microprocessor controller 106 determines whether a current running direction is opposite than the direction of the already written LTFS index having a same generation value as the requested LTFS index (decision 206).

If, microprocessor controller 106 determines that the LTFS index having the same generation value as the requested LTFS index is not already written to a location in the index partition of magnetic tape medium 120 ("no" branch, decision 204), then microprocessor controller 106 indicates to tape interface system 114 to write the LTFS index in the current running direction (step 210). In this embodiment, information for the LTFS index is updated in cartridge memory 156 subsequent to writing the LTFS index to the index partition on magnetic tape medium 120 that includes an LPOS for a first data block of the LTFS index, an LPOS for a last data block of the LTFS index, a write direction of the LTFS index, and generation value for the LTFS index.

If, microprocessor controller 106 determines that a current running direction is opposite than the direction of the already written LTFS index having a same generation value as the requested LTFS index ("yes" branch, decision 206), then microprocessor controller 106 indicates to tape interface system 114 to write the requested LTFS index to the index partition on magnetic tape medium 120 in the current running direction (step 210). As previously described, information for the LTFS index is updated on cartridge memory 156.

If, microprocessor controller 106 determines that a current running direction is not opposite than the direction of the already written LTFS index having a same generation value as the requested LTFS index ("no" branch, decision 206), then microprocessor controller 106 indicates to tape interface system 114 to write filler data in the current write direction until a corresponding wrap is complete (step 208). In this embodiment, microprocessor controller 106 can update cartridge memory 156 with information for the filler data, as previously discussed. Accordingly, at the completion of a tape wrap, the current write direction is changed to the opposite write direction, and microprocessor controller 106 can indicate to tape interface system 114 to write the requested LTFS index in the opposite write direction to the index partition of magnetic tape medium 120. In this embodiment, the current write direction after a completed wrap is an opposite running direction than a previous running direction before completing the wrap. Accordingly, an LTFS index is written to both the backward and forward directions in an index partition of magnetic tape medium 120.

Figure 3:
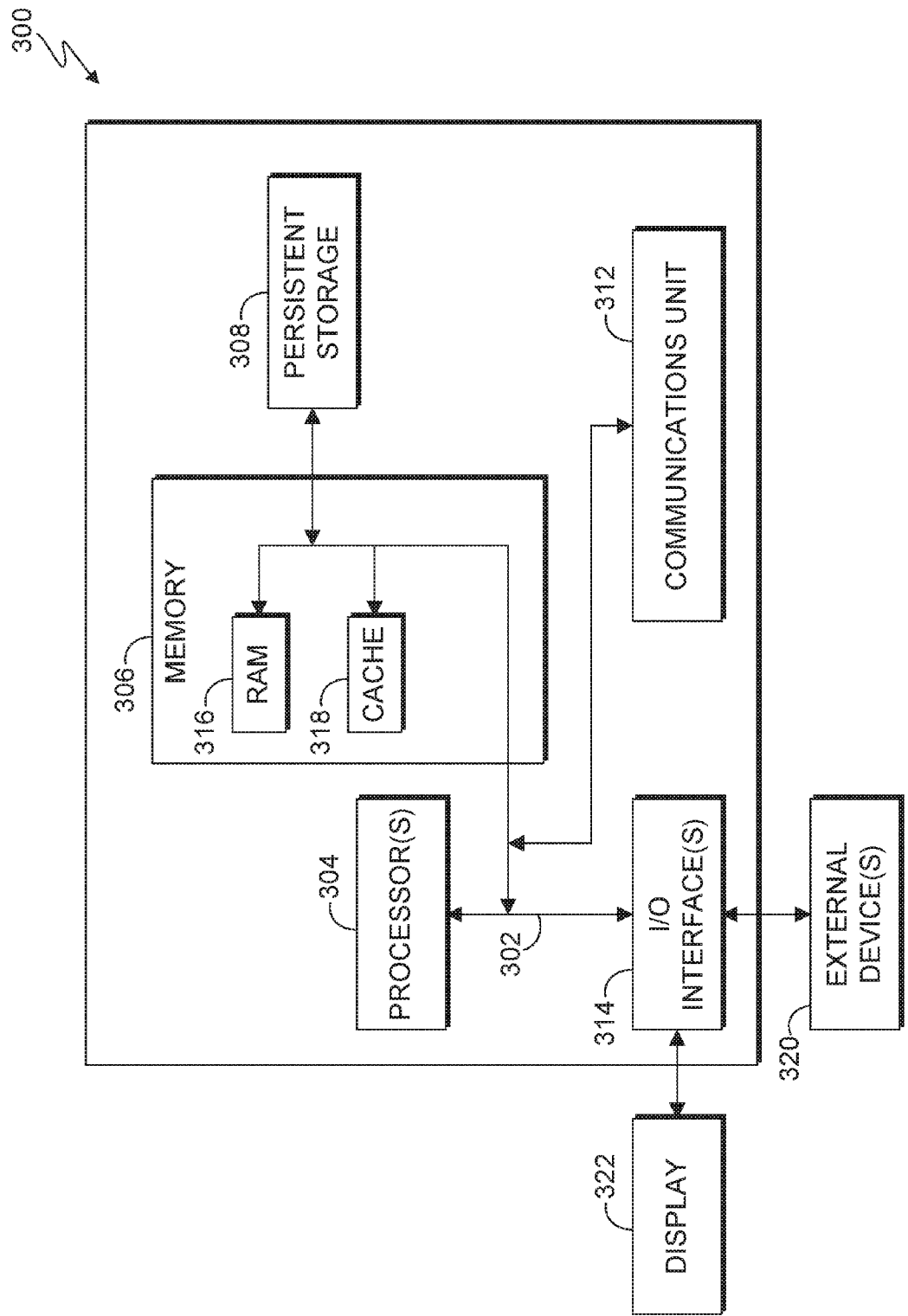
FIG. 3 is a block diagram of internal and external components of a host computer system of FIG. 1A, in accordance with an embodiment of the present invention.

FIG. 3 is a block diagram of internal and external components of host CPU 102 of FIG. 1A, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 312 provides for communications with other computer systems or devices via a network. In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 312 (e.g., via the Internet, a local area network or other wide area network). From communications unit 312, the software and data can be loaded onto persistent storage 408.

One or more I/O interfaces 314 allow for input and output of data with other devices that may be connected to computer system 300. For example, I/O interface 314 can provide a connection to one or more external devices 320, such as a keyboard, computer mouse, touch screen, virtual keyboard, touch pad, pointing device, or other human interface devices. External devices 320 can also include portable computer-readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a request to write a data set to a magnetic tape medium, wherein the data set consists of a first portion and a second portion;
   writing, by the one or more computer processors, the first portion of the data set in a first write direction of the magnetic tape medium;
   responsive to determining that a tape wrap in the first write direction is complete, writing, by the one or more computer processors, the second portion of the data set in an opposite write direction of the magnetic tape medium, whereby at the completion of the tape wrap in the first write direction, the current write direction is changed to the opposite write direction;
   writing, by the one or more computer processors, the first portion of the data set in the opposite write direction; and
   responsive to determining that a tape wrap in the opposite write direction is complete, writing, by the one or more computer processors, the second portion of the data set in the first write direction, whereby at the completion of the tape wrap in the opposite write direction, the current write direction is changed to the first write direction, and whereby all portions of the entire data set are written in the first write direction and all portions of the entire data set are written in the opposite write direction.

2. The method of claim 1, wherein the data set written in both the first write direction and written in the opposite write direction of the magnetic tape medium are of a same generation value.

3. The method of claim 1, wherein further comprising:
   writing, by the one or more computer processors, filler data in a write direction of the magnetic tape medium until a respective tape wrap in the write direction is complete.

4. The method of claim 1, further comprising:
   writing, by the one or more computer processors, to a cartridge memory to include information that includes at least one of: the first write direction for the data set, a longitudinal position (LPOS) for a first data block of the data set, an LPOS for a last data block the data set, a generation value for the data set; and
   reading, by the one or more computer processors, the information from the cartridge memory to identify the opposite write direction to write the data set.

5. The method of claim 1, wherein writing the data set in the first write direction of the magnetic tape medium comprises:
   responsive to determining that no data set previously written to the magnetic tape medium has a generation value that is the same as the generation value for the data set requested to be written on the magnetic tape medium, writing, by the one or more computer processors, the data set requested to be written to in the first write direction of the magnetic tape medium.

6. The method of claim 1, further comprising:
writing, by the one or more computer processors, all portions of the entire data set in the first write direction of the magnetic tape medium, wherein each of the all portions of entire data set is written to a unique tape wrap; and
writing, by the one or more computer processors, all portions of the entire data set in the opposite write direction of the magnetic tape medium, wherein each of the all portions of the entire data set is written to a unique tape wrap.

7. The method of claim 1, wherein the data set is a Linear Tape File System (LTFS) index requested to be written to an index partition of the magnetic tape medium.

8. A computer program product comprising:
one or more computer readable storage media and program instructions stored on the one or more computer readable storage media, the program instructions comprising:
program instructions to receive a request to write a data set to a magnetic tape medium, wherein the data set consists of a first portion and a second portion;
program instructions to write the first portion of the data set in a first write direction of the magnetic tape medium;
program instructions to, responsive to determining that a tape wrap in the first write direction is complete, write the second portion of the data set in an opposite write direction of the magnetic tape medium, whereby at the completion of the tape wrap in the first write direction, the current write direction is changed to the opposite write direction;
program instructions to write the first portion of the data set in the opposite write direction; and
program instructions to, responsive to determining that a tape wrap in the opposite write direction is complete, write the second portion of the data set in the first write direction, whereby at the completion of the tape wrap in the opposite write direction, the current write direction is changed to the first write direction, and whereby all portions of the entire data set are written in the first write direction and all portions of the entire data set are written in the opposite write direction.

9. The computer program product of claim 8, wherein the data set written in both the first write direction and written in the opposite write direction of the magnetic tape medium are of a same generation value.

10. The computer program product of claim 8, wherein the program instructions stored on the one or more computer readable storage media further comprise:
program instructions to write filler data in a write direction of the magnetic tape medium until a respective tape wrap in the write direction is complete.

11. The computer program product of claim 8, wherein the program instructions stored on the one or more computer readable storage media further comprise:
program instructions to write to a cartridge memory to include information that includes at least one of: the first write direction for the data set, a longitudinal position (LPOS) for a first data block of the data set, an LPOS for a last data block the data set, a generation value for the data set; and
program instructions to read the information from the cartridge memory to identify the opposite write direction to write the data set.

12. The computer program product of claim 8, wherein the program instruction to write the data set in the first write direction of the magnetic tape medium comprise:
program instructions to, responsive to determining that no data set previously written to the magnetic tape medium has a generation value that is the same as the generation value for the data set requested to be written on the magnetic tape medium, write the data set requested to be written to the first write direction of the magnetic tape medium.

13. The computer program product of claim 8, wherein the program instructions stored on the one or more computer readable storage media further comprise:
program instructions to write all portions of the entire data set in the first write direction of the magnetic tape medium, wherein each of the all portions of entire data set is written to a unique tape wrap; and
program instructions to write all portions of the entire data set in the opposite write direction of the magnetic tape medium, wherein each of the all portions of the entire data set is written to a unique tape wrap.

14. The computer program product of claim 8, wherein the data set is a Linear Tape File System (LTFS) index requested to be written to an index partition of the magnetic tape medium.

15. A computer system comprising:
one or more computer processors;
one or more computer readable storage media;
program instructions stored on the computer readable storage media for execution by at least one of the one or more processors, the program instructions comprising:
program instructions to receive a request to write a data set to a magnetic tape medium, wherein the data set consists of a first portion and a second portion;
program instructions to write the first portion of the data set in a first write direction of the magnetic tape medium;
program instructions to, responsive to determining that a tape wrap in the first write direction is complete, write the second portion of the data set in an opposite write direction of the magnetic tape medium, whereby at the completion of the tape wrap in the first write direction, the current write direction is changed to the opposite write direction;
program instructions to write the first portion of the data set in the opposite write direction; and
program instructions to, responsive to determining that a tape wrap in the opposite write direction is complete, write the second portion of the data set in the first write direction, whereby at the completion of the tape wrap in the opposite write direction, the current write direction is changed to the first write direction, and whereby all portions of the entire data set are written in the first write direction and all portions of the entire data set are written in the opposite write direction.

16. The computer system of claim 15, wherein the data set written in both the first write direction and written in the opposite write direction of the magnetic tape medium are of a same generation value.

17. The computer system of claim 15, wherein the program instructions stored on the one or more computer readable storage media further comprise:
program instructions to write filler data in a write direction of the magnetic tape medium until a respective tape wrap in the write direction is complete.

18. The computer system of claim 15, wherein the program instructions stored on the one or more computer readable storage media further comprise:
program instructions to write to a cartridge memory to include information that includes at least one of: the first write direction for the data set, a longitudinal position (LPOS) for a first data block of the data set, an LPOS for a last data block the data set, a generation value for the data set; and
program instructions to read the information from the cartridge memory to identify the opposite write direction to write the data set.

19. The computer system of claim 15, wherein the program instruction to write the data set in the first write direction of the magnetic tape medium comprise:
program instructions to, responsive to determining that no data set previously written to the magnetic tape medium has a generation value that is the same as the generation value for the data set requested to be written on the magnetic tape medium, write the data set requested to be written to the first write direction of the magnetic tape medium.

20. The computer system of claim 15, wherein the program instructions stored on the one or more computer readable storage media further comprise:
program instructions to write all portions of the entire data set in the first write direction of the magnetic tape medium, wherein each of the all portions of entire data set is written to a unique tape wrap; and
program instructions to write all portions of the entire data set in the opposite write direction of the magnetic tape medium, wherein each of the all portions of the entire data set is written to a unique tape wrap.

\* \* \* \* \*